US008514857B2

(12) United States Patent
Jeong et al.

(10) Patent No.: US 8,514,857 B2
(45) Date of Patent: Aug. 20, 2013

(54) VIRTUALIZATION-SUPPORTING PROGRAMMABLE PLATFORM DEVICE AND METHOD OF TRANSFERRING PACKET

(75) Inventors: Sang-Jin Jeong, Daejeon-si (KR); Myung-Ki Shin, Daejeon-si (KR); Hyoung-Jun Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 12/912,062

(22) Filed: Oct. 26, 2010

(65) Prior Publication Data

US 2011/0096785 A1 Apr. 28, 2011

(30) Foreign Application Priority Data

Oct. 27, 2009 (KR) .................. 10-2009-0102193
Jun. 25, 2010 (KR) .................. 10-2010-0060786

(51) Int. Cl.
*H04L 12/56* (2006.01)
*H04J 1/16* (2006.01)

(52) U.S. Cl.
USPC ............ 370/389; 370/252; 370/238; 709/238

(58) Field of Classification Search
USPC .......... 370/252, 237, 238, 389; 709/238–242
See application file for complete search history.

(56) References Cited

U.S. PATENT DOCUMENTS

2003/0135578 A1\* 7/2003 Banga et al. ............... 709/215
2010/0061378 A1\* 3/2010 Joyner et al. ............ 370/395.53

OTHER PUBLICATIONS

"ProtoGENI Contol Framework Overview", The GENI Project Office, Cambridge, MA; 36pp, Jan. 14, 2009.
"Life of a Packet within a GENI Experiment", 10 pp, Apr. 2, 2007.

\* cited by examiner

*Primary Examiner* — John Pezzlo
(74) *Attorney, Agent, or Firm* — Staas & Halsey LLP

(57) ABSTRACT

Provided are a virtualization-supporting programmable platform device and a method of transferring a packet. The method includes, when a switch receives a packet including a destination sliver identifier (ID) and a virtual interface (VIF) ID, transferring, at the switch, the received packet to a sliver selected on the basis of the destination sliver ID, and transferring, at the sliver receiving the packet, the received packet to one of VIFs of the sliver on the basis of the VIF ID. Accordingly, a programmable platform or router supporting network virtualization can identify IDs of slivers, which are resources allocated to users in the future Internet, and VIFs connected to the respective slivers.

4 Claims, 9 Drawing Sheets

VIRTUALIZATION-SUPPORTING PROGRAMMABLE PLATFORM DEVICE AND METHOD OF TRANSFERRING PACKET

CROSS-REFERENCE TO RELATED APPLICATION(S)

This application claims the benefit under 35 U.S.C. §119(a) of Korean Patent Application Nos. 10-2009-0102193, filed on Oct. 27, 2009, and 10-2010-0060786, filed on Jun. 25, 2010, the disclosures of which are incorporated herein by references for all purposes.

BACKGROUND

1. Field

The following description relates to the future Internet, and more particularly, to a virtualization-supporting programmable platform device and a method of transferring a packet to identify resources in the future Internet.

2. Description of the Related Art

Network virtualization technology for constructing several virtual networks over a single physical network is a core technology of the future Internet. The network virtualization technology is a solution to de-ossify the current Internet architecture. Network virtualization enables the entire resources in a physical network including links and nodes to be virtualized. Thus, applications/services/user-specific virtual networks having different requirements can simultaneously coexist over single physical infrastructure.

To control resources of the future Internet supporting network virtualization such as routers, personal computers (PCs), and cluster nodes, a variety of control frameworks such as ProtoGENI and PlanetLab are being developed.

However, the various control frameworks have limited target resources. For example, ProtoGENI controls Emulab nodes, and PlanetLab controls PCs.

Meanwhile, a control framework which can manage a programmable platform such as a programmable router, in particular, a high-speed programmable platform based on a network processor, is not yet under development.

A core requirement of a future Internet control framework supporting network virtualization is to identify resources on the future Internet, connect the resources with each other, provide a user with the connected resources, and thereby enable the user to test various future Internet technologies.

Conventionally, a universally unique identifier (UUID) defined in Internet engineering taskforce (IETF) request for comments (RFC) 4122, a private key of a public key infrastructure (PKI) scheme, a uniform resource name (URN), etc., are used to identify resources of the future Internet, in particular, a sliver and a slice.

However, in such conventional art, the length of an identifier (ID) is 128 bits or more, that is, long. Also, the ID is not hierarchically managed and not compatible with a packet format of global environment for network innovations (GENI), which is a future Internet testbed.

SUMMARY

The following description relates to a packet transfer method which facilitates identification of resources on the future Internet, connects the resources, and thereby enables a user to test various future Internet technologies.

According to an exemplary aspect, there is provided a method of transferring a packet, including: when a switch receives a packet via a virtual local area network (VLAN), removing an outer VLAN tag from the received packet; when the packet includes a destination sliver identifier (ID) and a virtual interface (VIF) ID, transferring the received packet to a sliver selected on the basis of the destination sliver ID; and transferring, at the sliver receiving the packet, the received packet to one of VIFs of the sliver on the basis of the VIF ID.

According to another exemplary aspect, there is provided a method of transferring a packet, including: including a destination sliver identifier (ID) and a virtual interface (VIF) ID in a packet to be transmitted; and transmitting the packet including the destination sliver ID and the VIF ID to a destination sliver.

According to yet another exemplary aspect, there is provided a virtualization-supporting programmable platform device, including: a sliver communicator configured to receive a packet to which an experiment header is added from a sliver; a header inserter configured to insert a testbed header including a destination sliver identifier (ID) and a virtual interface (VIF) ID in the packet received from the sliver; and a network communicator configured to transmit the packet in which the testbed header is inserted to a destination sliver.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION

Figure 1:
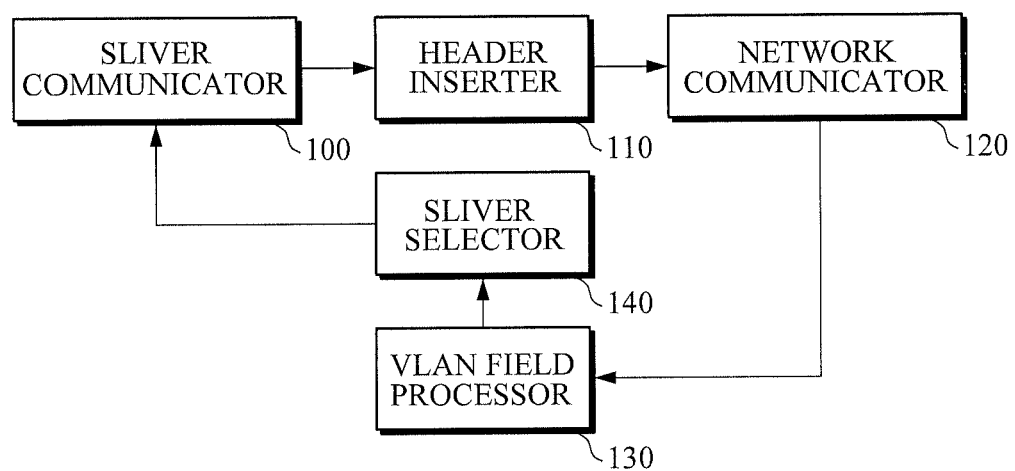
FIG. 1 is a block diagram of a virtualization-supporting programmable platform device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram of a virtualization-supporting programmable platform device according to an exemplary embodiment of the present invention.

The virtualization-supporting programmable platform device according to an exemplary embodiment of the present invention can be installed on a physical apparatus, such as a switching apparatus or a router, of a future Internet testbed.

As shown in FIG. 1, the virtualization-supporting programmable platform device includes a sliver communicator 100, a header inserter 110, a network communicator 120, a virtual local area network (VLAN) field processor 130, and a sliver selector 140.

The sliver communicator 100 exchanges a packet with a sliver generated from a resource on the virtualization-supporting platform device or a future Internet testbed.

The header inserter 110 includes a testbed header including a destination sliver identifier (ID) and a virtual interface (VIF) ID in a packet requested for transmission by a sliver through the sliver communicator 100. In an exemplary embodiment, the testbed header can be implemented in the form of a conventional global environment for network innovations (GENI) Mux header. A 2-byte sliver ID and a 2-byte VIF ID are added to a conventional Ethernet L2 frame, so that a testbed head can be inserted. The sliver ID and the VIF ID may be allocated by a resource manager of the future Internet.

The VLAN field processor 130 removes a portion encapsulated with a VLAN tag to transfer a packet via a VLAN in the future Internet.

The network communicator 120 transmits the packet, in which the testbed header is inserted by the header inserter 110, to another resource in the future Internet via a network. Also, the network communicator 120 receives a packet transmitted from the other resource.

In an exemplary embodiment, a resource indicates the abstract concept of a sharable function of a component defined and allocated according to a resource description standard (request specification (R Spec)) in infrastructure. Infrastructure resources are classified into computation, communication, measurement, storage, and so on.

R Spec is a standard for expressing future Internet resources, and may describe resource specification, resource allocation requests, resource allocation details, and also relationships between respective resources. Using R Spec, respective components on future Internet infrastructure can exchange resource information in a standardized method. R Spec can be expressed in a variety of forms, and is generally expressed using an extensible markup language (XML) schema.

A component is a group of physical resources such as a central processing unit (CPU), a memory, a disk, and a link bandwidth, and logical resources such as a file descriptor and a port number.

A sliver denotes a component resource shared between several users on infrastructure. A sliver can be obtained by virtualizing a component or dividing a component into several sets of resources. In this case, it is defined that a user has obtained the right to use the sliver. Each component needs to include a hardware or software mechanism which can maintain respective slivers separate from each other. A sliver is, for example, a virtual server, a virtual router, a virtual switch, or a virtual access point.

A slice denotes a substrate global network of computation and communication resources supporting service defined by a user on infrastructure. A slice is a basic unit for withdrawing resources, and consists of a set of slivers extended from a set of network resources and a set of users permitted to access such a sliver. The users permitted to access a slice can perform an experiment and provide service in the slice, and test a new network architecture.

Figure 2:
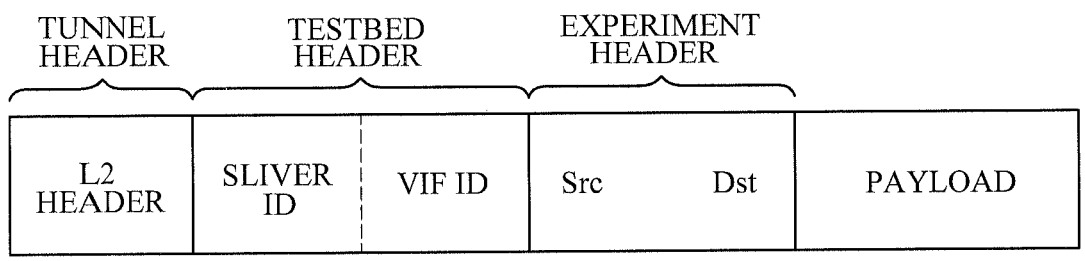
FIG. 2 illustrates a packet format of global environment for network innovations (GENI) which is a general future Internet testbed.

FIG. 2 illustrates a packet format of GENT which is a general future Internet testbed.

As shown in FIG. 2, an experiment header 24 may contain an address of a mobile terminal, and the information of the experiment header 24 is inserted by a sliver executed at the origin of the packet. The address information of the mobile terminal is processed by slivers executed by a component while the packet is passed via a network.

A testbed header 22 is required when the corresponding testbed component demultiplexes and sends the demultiplexed packet to an appropriate sliver. In an exemplary embodiment, a testbed may be GENI. The testbed header 22 includes a sliver ID and a VIF ID of an interface in a sliver to receive the packet.

A tunnel header 20 is a field for identifying a quality of service (QoS) guaranteed tunnel set to send the packet. The formats of the testbed header 22 and the tunnel header 20 are distinguished from each other in a link between two components of the corresponding testbed, and an L2 header may be changed while passed through the components according to a used layer 2 technology.

In an exemplary embodiment, an address of a mobile terminal is inserted in the experiment header 24, and the sliver ID to receive the packet at a programmable access point (PAP) and a programmable edge node (PEN) and the VIF ID of the sliver are inserted in the testbed header 22.

In other words, it is possible to develop a new layer 3 protocol other than an existing Internet protocol (IP) in a specific testbed environment such as GENI. No conventional format of a testbed header has been defined yet. A testbed header needs to be designed to connect a sliver on a testbed capable of recognizing the testbed header with a sliver on a testbed incapable of recognizing the testbed header.

Figure 3:
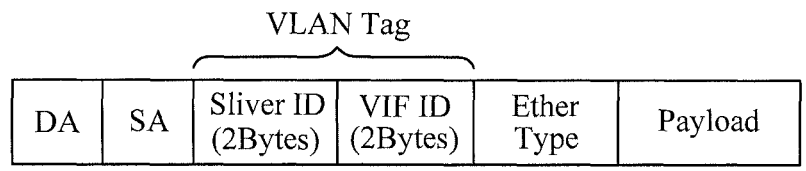
FIG. 3 illustrates a testbed header format according to an exemplary embodiment of the present invention.

A future Internet resource identification scheme according to an exemplary embodiment will be described below with reference to FIGS. 3 to 5. FIG. 3 illustrates a testbed header format according to an exemplary embodiment of the present invention.

As shown in FIG. 3, in an exemplary embodiment, a testbed header is obtained by adding a 2-byte sliver ID and a 2-byte VIF ID to a conventional Ethernet L2 frame. The sliver ID and the VIF ID are determined and allocated at the discretion of a resource manager of the future Internet. When a programmable platform supporting network virtualization on a future Internet testbed receives a packet additionally including a 2-byte sliver ID and a 2-byte VIF ID, the programmable platform transfers the received packet to a sliver having the sliver ID specified in the received packet among slivers generated in the programmable platform itself.

The sliver receiving the packet determines to which interface the packet will be transferred using the VIF ID in the packet.

Figure 4:
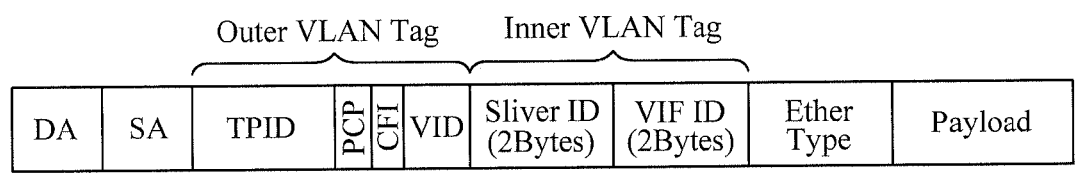
FIG. 4 illustrates an example of a packet format when a virtual local area network (VLAN) scheme is applied to resources on one future Internet testbed for the sake of interoperation between generated slivers according to a resource identification scheme according to an exemplary embodiment of the present invention.

FIG. 4 illustrates an example of a packet format when a VLAN scheme is applied to resources on one future Internet testbed for the sake of interoperation between generated slivers according to a resource identification scheme according to an exemplary embodiment of the present invention. As shown in FIG. 4, in this case, an outer VLAN tag includes a tag protocol ID (TPID) for determining whether a tag is allocated to the frame, a priority code point (PCP) for determining priorities of different traffic types such as voice, video, and data, a canonical format indicator (CFI) for determining whether the packet format conforms to an Ethernet standard format, and a VLAN ID (VID) for identifying a VLAN. An inner VLAN tag includes a 2-byte sliver ID and a 2-byte VIF ID.

Figure 5:
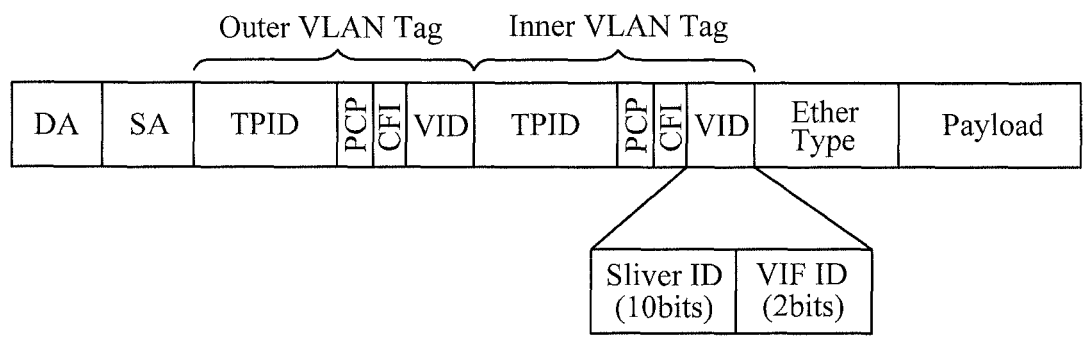
FIG. 5 illustrates an example of a packet format when the conventional VLAN scheme is applied to resources on several future Internet testbeds for the sake of interoperation between generated slivers according to a resource identification scheme according to another exemplary embodiment of the present invention.

FIG. 5 illustrates an example of a packet format when the conventional VLAN scheme is applied to resources on several future Internet testbeds for the sake of interoperation between generated slivers according to a resource identification scheme according to another exemplary embodiment of the present invention. As shown in FIG. 5, the outer VLAN tag includes the TPID, PCP, CFI and VID, and the inner VLAN tag includes the TPID for identifying a testbed, PCP, CFI and VID. Here, a sliver ID and a VIF ID are included in the VID of the inner VLAN tag. In this way, a packet has the same format as a conventional packet of Institute of Electrical and Electronics Engineers (IEEE) 802.1ad, and a VID in the packet is separately used as a 10-bit sliver ID and a 2-bit VIF ID, so that a GENI packet of the conventional Internet can be transferred between different types of future Internet testbeds.

Figure 6:
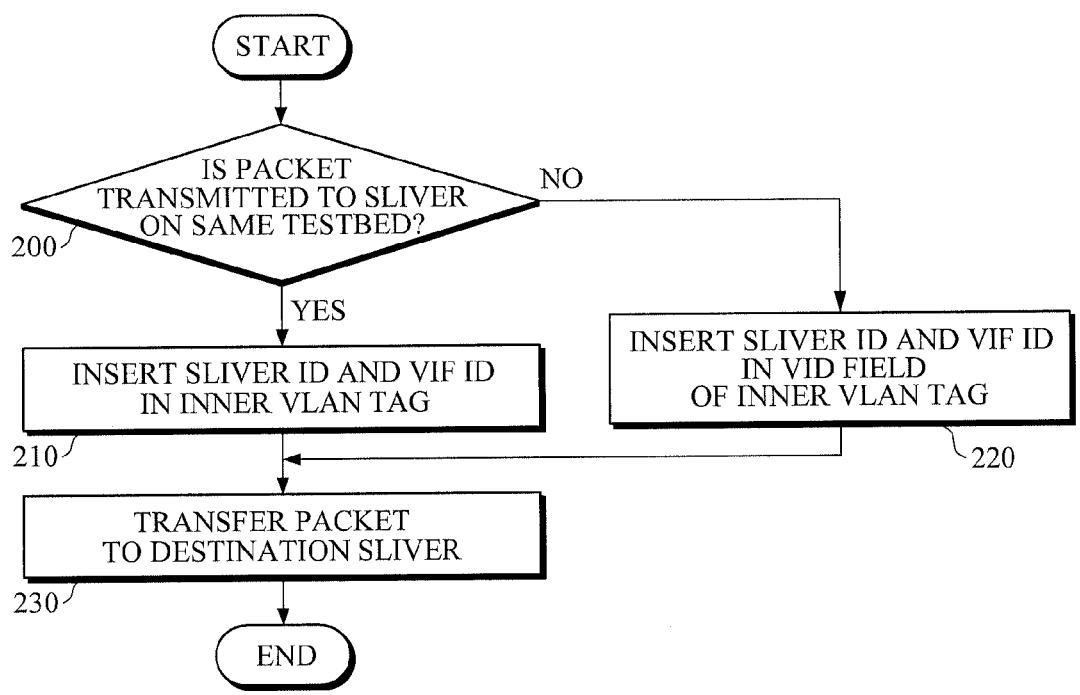
FIG. 6 is a flowchart illustrating a packet transmitting method according to an exemplary embodiment of the present invention.
Figure 7:
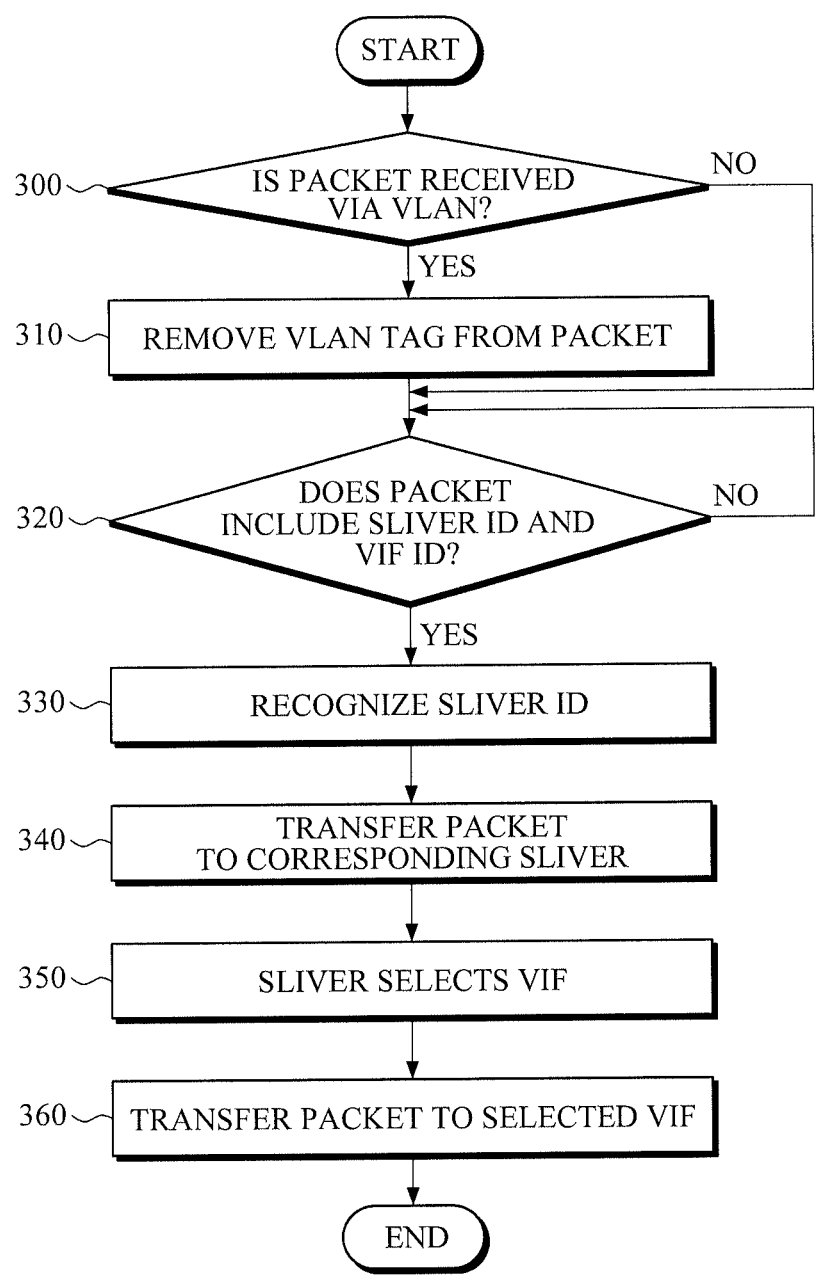
FIG. 7 is a flowchart illustrating a packet receiving method according to an exemplary embodiment of the present invention.

FIGS. 6 and 7 are flowcharts illustrating a method of transferring a packet according to an exemplary embodiment of the present invention.

More specifically, FIG. 6 is a flowchart illustrating a packet transmitting method, and FIG. 7 is a flowchart illustrating a packet receiving method.

As shown in FIG. 6, a programmable platform supporting network virtualization determines whether or not a packet is transmitted to a sliver on the same testbed (200). When the packet is transmitted to a sliver on the same testbed, the programmable platform inserts a destination sliver ID and a VIF ID in an inner VLAN tag (210). Here, the sliver ID and the VIF ID can be obtained from a resource management apparatus of the future Internet.

On the other hand, when it is determined in operation 200 that the packet is transmitted to a sliver on a different type of testbed, the programmable platform inserts a destination sliver ID and a VIF ID in a VID field in an inner VLAN tag (220).

Subsequently, a switching apparatus to which a sliver transmitting the packet belongs transmits the packet including the sliver ID and the VIF ID to a switching apparatus to which the destination sliver belongs (230).

A packet receiving process will be described with reference to FIG. 7. First, a switch determines whether a packet is received via a VLAN (300). When the packet is received via a VLAN, the switch removes an outer VLAN tag from the packet (310). On the other hand, when the packet is not received via a VLAN, the operation of removing an outer VLAN tag (310) is skipped.

Subsequently, it is determined whether or not a destination sliver ID and a VIF ID are included in the received packet (320). When a destination sliver ID and a VIF ID are included in the received packet, the destination sliver ID is recognized (330). When a destination sliver ID and a VIF ID are not included in the received packet, a general packet processing operation is performed. A sliver corresponding to the destination sliver ID is selected according to the recognized destination sliver ID, and the packet is transferred to the selected sliver (340). Then, the sliver receiving the packet selects a VIF on the basis of the VIF ID included in the packet (350), and transfers the received packet to the selected VIF (360).

Figure 8:
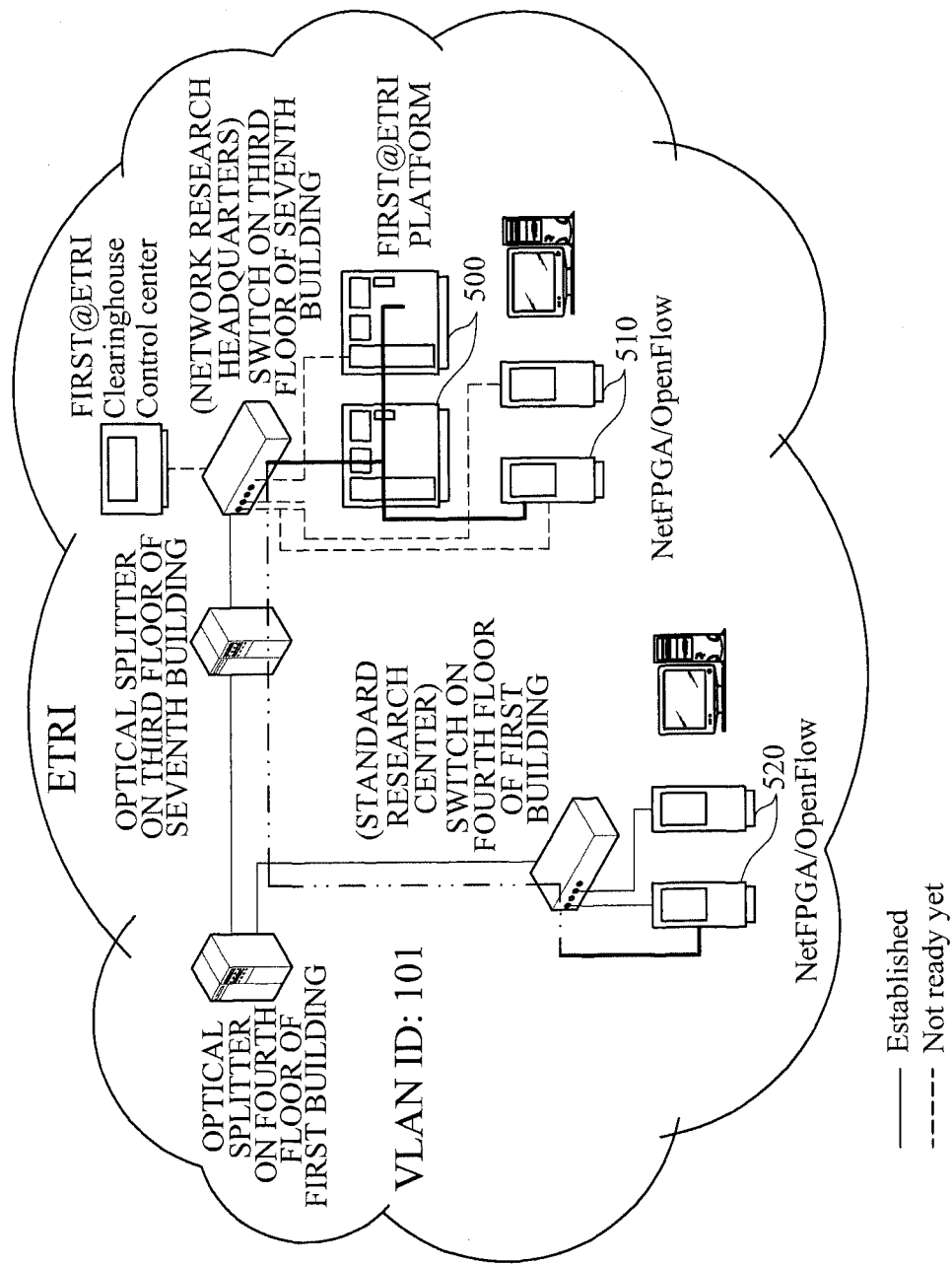
FIG. 8 illustrates a case in which a future Internet resource identification scheme according to an exemplary embodiment of the present invention is applied to a single future Internet testbed.

FIG. 8 illustrates a case in which a future Internet resource identification scheme according to an exemplary embodiment of the present invention is applied to a single future Internet testbed.

As shown in FIG. 8, in an exemplary embodiment, a programmable platform 500 supporting network virtualization generates a testbed packet. In other words, the programmable platform inserts a sliver ID and a VIF ID to generate a packet including a testbed header. The programmable platform transmits the packet including the testbed header to a counterpart sliver.

At this time, when the programmable platform transmits the packet to a sliver formed in a resource 510 present in the same switch, for example, a switch of Network Research Headquarters on the third floor of the seventh building in FIG. 8, the switch simply transfers the packet to the sliver.

On the other hand, when a sliver formed in a resource 520 to receive the packet in another switch, for example, a switch of Standard Research Center on the fourth floor of the first building in FIG. 8, the switch of the transmitting side on the third floor of the seventh building transfers the packet to a switch of the receiving side, to which the sliver belongs, on the fourth floor of the first building using a set VID. The switch of the receiving side on the fourth floor of the first building removes a VLAN header from the received packet, and forwards the packet to the sliver according to the sliver ID included in the received packet. Here, the VLAN header indicates fields corresponding to an VLAN tag in FIG. 3.

Figure 9:
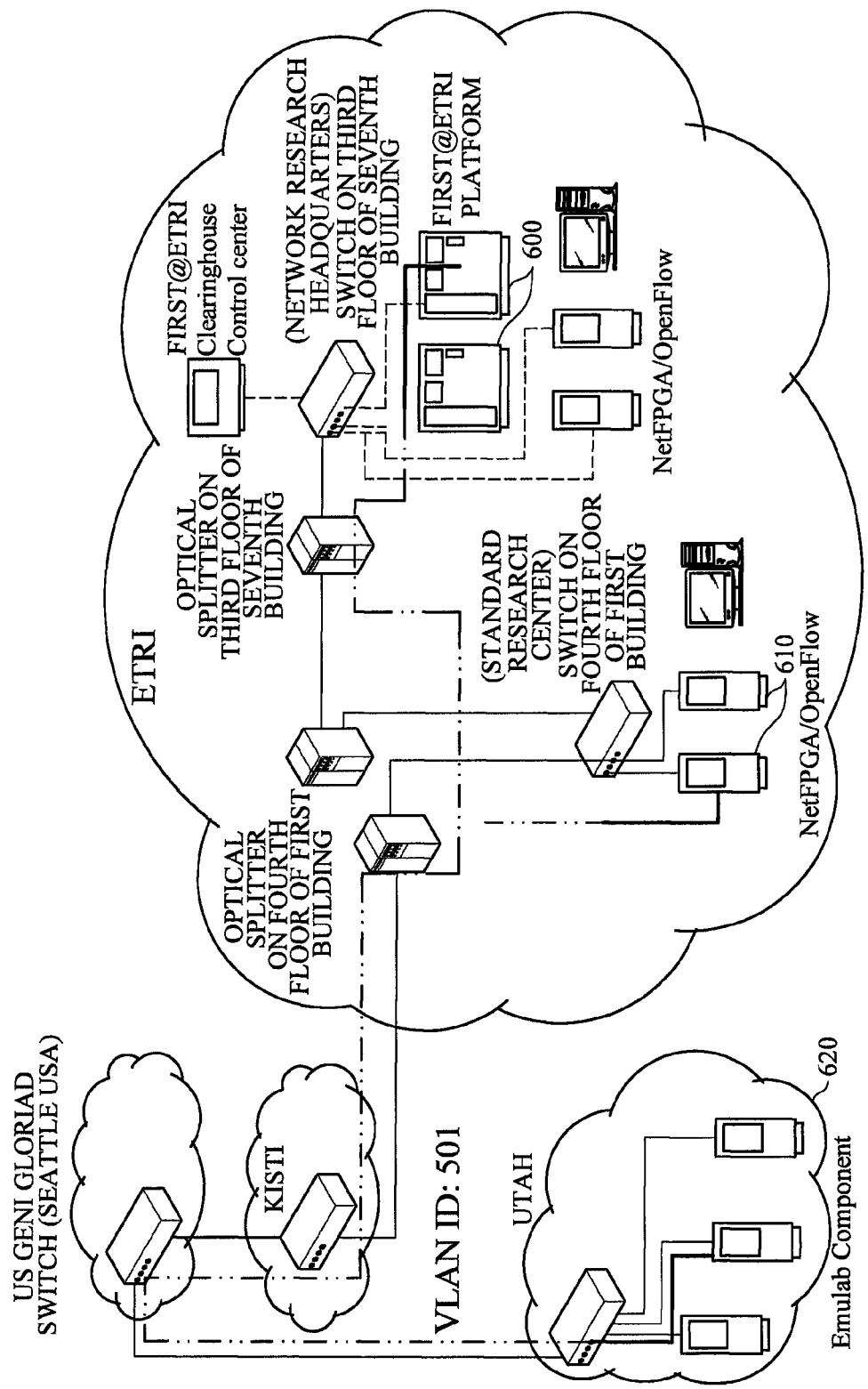
FIG. 9 illustrates a case in which a future Internet resource identification scheme according to an exemplary embodiment of the present invention is applied to different types of future Internet testbeds.

FIG. 9 illustrates a case in which a future Internet resource identification scheme according to an exemplary embodiment of the present invention is applied to different types of future Internet testbeds.

A case in which a packet is transmitted to a sliver of a future Internet testbed employing a switch to which an exemplary embodiment of the present invention is not applied, that is, a UTAH switch will be described with reference to FIG. 9.

When a packet is transmitted to slivers 610 and 620 belonging to different testbeds, a programmable platform 600 transmitting the packet generates the packet to have a conventional VLAN tag and includes a 10-bit sliver ID and a 2-bit VIF ID in a VID field of the VLAN tag, thereby inserting a testbed header. A switch on the third floor of the seventh building receiving the packet generates an outer VLAN tag in the packet using a VID set in advance, and transfers the packet to a switch to which a receiving sliver belongs, that is, a switch on the fourth floor of the first building and a UTAH switch in FIG. 9.

The switch on the fourth floor of the first building and the UTAH switch receiving the packet remove the outer VLAN tag and transfer the packet to the corresponding resources. The resources receiving the packet extract the sliver ID and the VIF ID from the VID of an inner VLAN tag and transfer the packet to the slivers 610 and 620.

The exemplary embodiments of the present invention can also be embodied as computer-readable codes on a computer-readable recording medium. Codes and code segments constituting the programs can be easily deduced by computer programmers skilled in the art. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can also be distributed over network connected computer systems so that the computer-readable code is stored and executed in a distributed fashion.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of transferring a packet, comprising:
   including a destination sliver identifier (ID) and a virtual interface (VIF) ID in a packet to be transmitted; and
   transmitting the packet including the destination sliver ID and the VIF ID to a destination sliver, and
   wherein the including of the destination sliver ID and the VIF ID in the packet to be transmitted comprises inserting a testbed header including the 2-byte destination sliver ID and the 2-byte VIF ID between a tunnel header and an experiment header of the packet to be transmitted.

2. The method of claim 1, wherein the including of the destination sliver ID and the VIF ID in the packet to be transmitted comprises including the destination sliver ID and the VIF ID in a virtual local area network (VLAN) tag.

3. The method of claim 2, wherein the including of the destination sliver ID and the VIF ID in the packet to be transmitted comprises including the destination sliver ID and the VIF ID in the VLAN ID (VID) of the inner VLAN tag.

4. The method of claim 3, wherein the including of the destination sliver ID and the VIF ID in the packet to be transmitted includes including the 10-bit destination sliver ID and the 2-bit VIF ID in the VID field.

* * * * *